United States Patent Office 3,737,542
Patented June 5, 1973

3,737,542
LOWERING EXCESSIVE SERUM LIPID CONCENTRATIONS AND PREPARATIONS CONTAINING FLUORO-PYRIDINE DERIVATIVES
Lars Anders Fritz Carlsson, Forfattarvagen 27, Bromma, Sweden; Åke John Erik Helgstrand, Baverstigen 32, Enhorna, Sweden; and Berndt Olof Harald Sjoberg, Kummelvagen 24; and Nils Erik Stjernstrom, Tappgatan 9, both of Sodertalje, Sweden
No Drawing. Continuation-in-part of application Ser. No. 689,751, Nov. 15, 1967, now Patent No. 3,637,714. This application Aug. 20, 1971, Ser. No. 173,678
Claims priority, application Sweden, Nov. 16, 1966, 15,717/66
Int. Cl. A01n 9/22; A61k 15/12
U.S. Cl. 424—263   15 Claims

ABSTRACT OF THE DISCLOSURE

A method of lowering excessive lipid and free fatty acid concentration in serum of animals, including man, comprises administering a composition containing as the active ingredient a therapeutically effective dose of at least one compound selected from the group consisting of pyridine derivatives of the general formula

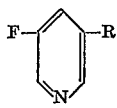

and therapeutically acceptable salts thereof. The active ingredients exhibit vasodilating properties. Pharmaceutical preparations containing the pyridine derivatives as active ingredients are also disclosed.

---

This application is a continuation-in-part application of our copending parent application Ser. No. 689,751, filed Nov. 15, 1967, now U.S. Pat. 3,637,714.

The present invention relates to serum lipid lowering pyridine derivatives having vasodilating properties and pharmaceutical preparations containing them. The invention also relates to a method for lowering excessive concentration of free fatty acids in serum of animals, including man.

In view of accumulating evidence indicating that excessive serum lipid concentration is correlated to basic pathogenetic mechanisms and to symptoms of several diseases such as vascular diseases, diabetes mellitus, and hyperthyroidism, lowering of serum lipid concentration is important during treatment of such diseases.

The lowering of serum lipid concentration may be obtained by inhibition of lipid mobilization, e.g. by a decrease in the net release of lipids to the circulation in the form of free fatty acids, from stored triglycerides in adipose tissue.

It has now been found that compounds of the general formula

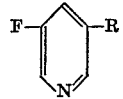
(I)

and therapeutically acceptable salts thereof have vasodilating properties and are of particular value for lowering of excessive serum lipid and free fatty acid concentration, in which formula R is a radical selected from the group consisting of
—COOH,
—CH$_2$OH,
—COOCH$_3$,
—COOC$_2$H$_5$,
—COOC$_4$H$_9$,
—COOC$_6$H$_{13}$,
—COOC$_{11}$H$_{23}$,
—COOCH(CH$_3$)$_2$,
—COOCH$_2$—CH=CH$_2$, —COO—CH$\begin{smallmatrix}CH_2-CH_2\\ \\CH_2-CH_2\end{smallmatrix}$CH$_2$, —CH$_2$OCOCH$_3$,
—CH$_2$OCOC(CH$_3$)$_3$,
—CH$_2$OCOCH$_2$—CH=CH$_2$,
—CH$_2$OCO(CH$_2$)$_4$CH$_3$,

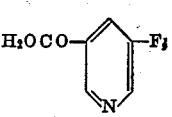

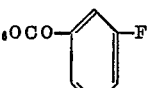

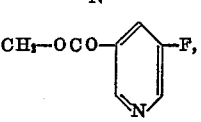

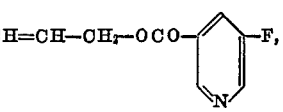

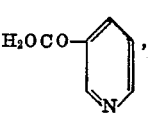

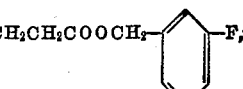

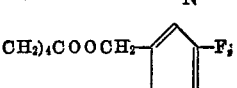

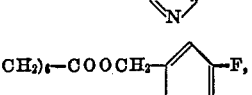

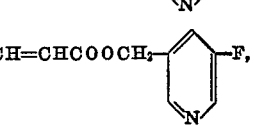

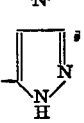

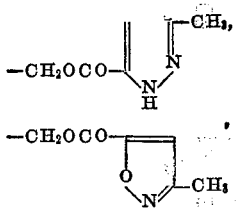

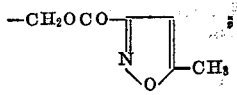

and

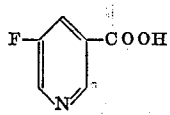

The expression "therapeutically acceptable salt" is recognized in the art to designate an acid addition salt which is physiologically innocuous when administered in a dosage and at an interval (e.g. frequency of administration) that is effective for the indicated therapeutic use of the parent compound. Typical therapeutically acceptable acid addition salts include but are not limited to the salts of mineral acids, such as hydrochloric, hydrobromic, phosphoric or sulphuric acid, organic acids such as acetic, lactic, levulinic, citric, fumaric, maleic, succinic, tartaric, benzoic acid and sulphonic acids, such as methane sulphonic acid and sulphamic acid.

Suitable processes for the preparation of the above mentioned compounds are illustrated below. All the illustrated methods of preparation are known in the art. The compounds used as starting materials in the different processes may be prepared according to known methods.

The compound of the formula

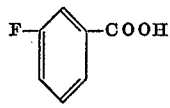 (II)

may be prepared, for example, as described by Roe in U.S. Pat. No. 2,516,830; by carbonation of Grignard reagents (X is halogen)

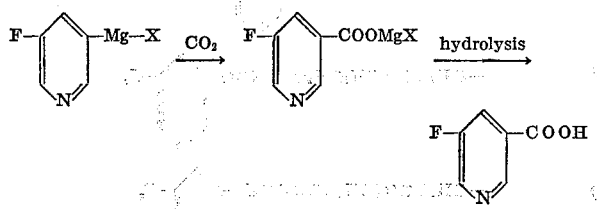

or by oxidation of the corresponding alcohol or aldahyde.

The compound of Formula II may also be prepared by reacting a compound of the formula

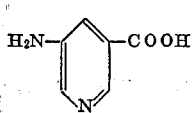

with sodium nitrite and fluoboric acid in an aqueous solution and heating the fluoborate salt thus formed to the formation of a compound of the formula

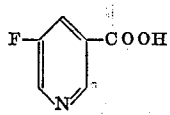

Preferably the reaction of the aminonicotinic acid is carried out in a cooled water solution also containing tetrahydrofuran.

The compounds of the formula

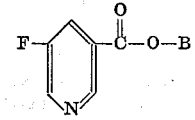 (III)

wherein B is a member of the group consisting of

—CH₃,
—C₂H₅,
—C₄H₉,
—C₆H₁₃,
—C₁₁H₂₃,
—CH(CH₃)₂,
—CH₂—CH=CH₂,

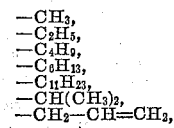

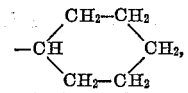

and

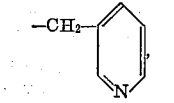

may be prepared by reacting a compound of the formula

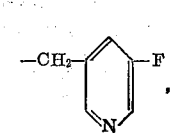 (IV)

with a compound of the formula

Y—B   (V)

wherein, in Formulas IV and V, B has the meaning specified above, Y is halogen or a hydroxy group and X is carboxyl, a metal carboxylate group or an activated carboxyl group, in which case the compound of Formula IV is an acid chloride, an alkyl ester, an acid anhydride or a mixed anhydride with alkoxy formic acids, carboxylic acids, sulphonic or inorganic acids or derivatives obtained by a reaction between a carboxylic acid and a carbodiimide or similarly functioning compounds such as N,N'-carbonyldiimidazole or N-ethyl-5-phenylisoxazolium-3'-sulphonate, X being a metal carboxylate group when Y is halogen, whereafter the compound of Formula III thus obtained if necessary is transformed into a therapeutically acceptable salt by reaction with the appropriate acid.

The reaction may be performed in the presence of aqueous or anhydrous organic solvents such as chloroform, diethyl ether, tetrahydrofuran, benzene and toluene, or without solvents. Particularly when X represents a carboxyl group and Y is a hydroxy group there may be used an acid catalyst such as sulphuric acid, hydrogen chloride, p-toluene sulphonic acid, benzene sulphonic acid or salts with high to intermediate acid strength, even including ion exchangers saturated with hydrogen ions. In this case, in order to get a more favorable equilibrium, the water formed during the reaction may be removed from the reaction mixture by azeotropic distillation or taken up by drying agents such as anhydrous cupric or manganese sulphate and molecular sieves. When the compound of Formula IV is an acid halide, the hydrogen halide liberated may be neutralized and the reaction catalyzed by a base such as pyridine and triethylamine.

Compounds of the formula

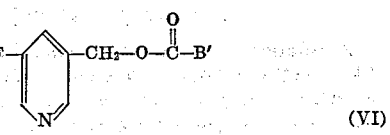

wherein B' is selected from the class consisting of $CH_3$, $C(CH_3)_3$, $CH_2-CH=CH_2$, $(CH_2)_6CO_3$,

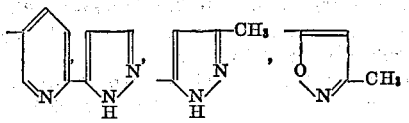

and

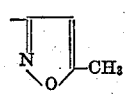

may be prepared by reacting a compound of the formula

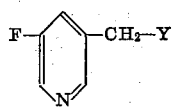

with a compound of the formula $$X-B' \qquad (VIII)$$

wherein X, Y and B' have the meaning specified above. The reaction conditions are the same as for preparation of the nicotinic acid esters. The compounds of Formula VI thus obtained are transformed, if necessary, into a therapeutically acceptable salt by reaction with the appropriate acid.

Diesters of pyridine of the general formulas

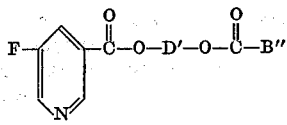

and

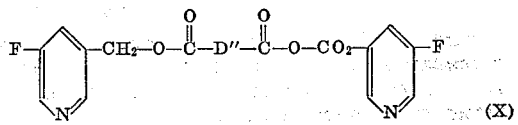

wherein, in Formula IX, D' is selected from the group consisting of $-(CH_2)_2-$, $-(CH_2)_6-$, $$-\overset{CH_3}{\underset{|}{CH}}-CH_2-$$

and $-CH_2CH=CH-CH_2-$; and B'' is the radical

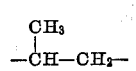

or, provided D' is $-(CH_2)_2-$, B'' may also be

and wherein, in Formula X, D'' is selected from the class consisting of $-(CH_2)_2-$, $-(CH_2)_4-$, $-(CH_2)_6-$, and $-CH=CH-$, may be prepared by reacting compounds of the formulas

and

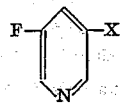

and

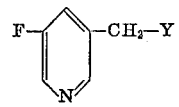

respectively, with compounds of the formulas

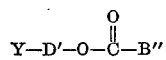

and

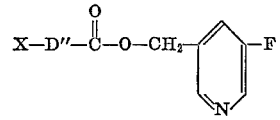

respectively, or by reacting compounds of the formulas

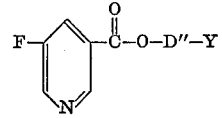

and

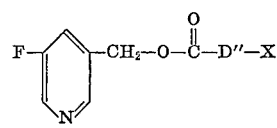

respectively, with compounds of the formula $$X-B''$$

and

respectively, wherein X and Y have the meaning specified previously. The reaction conditions are the same as for preparation of the nicotinic acid esters.

In the case where the compounds of Formula IX, when B'' is the radical

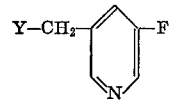

and Formula X are

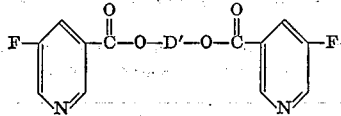

and

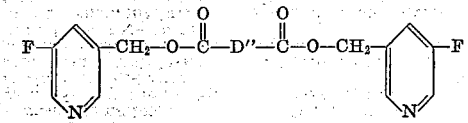

respectively they can be prepared by reacting compounds of the formulas

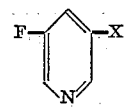

and

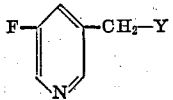

respectively, with compounds of the formulas

and

respectively, wherein X and Y have the meaning specified above. The reaction conditions are the same as for preparation of the nicotinic acid esters.

To prepare the compound of the formula

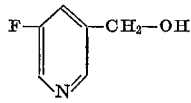

a compound of the general formula

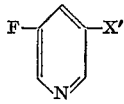

or a salt thereof, wherein X' is a formyl, carboxy, chlorocarbonyl, alkoxycarbonyl, thiolester

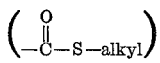

or a cyano group, is reduced by methods known to be applicable to the reduction of the unsubstituted analogues, for examyle, catalytical hydrogenation and reduction by means of a complex metal hydride, to the formation of a compound of the Formula XI

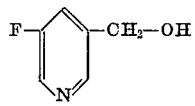

and, where a therapeutically acceptable salt is required, reacting the compound of Formula XI with an appropriate acid.

According to a preferred embodiment, a compound of the Formula XII, wherein X' is an alkoxy carbonyl group of at most 5 carbon atoms, is reduced by means of complex metal hydrides, such as sodium or potassium borohydride and lithium aluminum hydride. In cases when potassium or sodium borohydride is used as the reducin agent, the reaction may be performed in such solvents as methanol, ethanol, water or mixtures thereof. When lithium aluminum hydride is used as the reducing agent, the reaction is preferably performed in inert solvents such as diethyl ether and tetrahydrofuran.

The compound of Formula XI may also be prepared by treating an amine of the formula

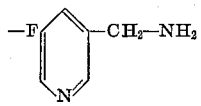

with a nitrite such as sodium nitrite in a water solution under such conditions that the intermediate diazonium compound decomposes and reacts with water to form an alcohol.

In treating animals, including man, the compounds of the invention may be administered orally or by injection in the form of pharmaceutical preparations comprising a therapeutically effective amount of at least one of the previously disclosed pyridine derivatives as the active ingredient. The active ingredient may be present either as a free base or as a therapeutically acceptable acid addition salt, e.g. the hydrochloride, hydrosulphate, or the like, in association with a pharmaceutically acceptable carrier. The active ingredient may be a mixture of one or more fluoropyridine derivatives according to the invention or a mixture of their salts or a combination of different compounds and salts. Accordingly, terms relating to the novel compounds of this invention whether generically or specifically are intended to include both the free base and the acid addition salts of the free base, unless the context in which such terms are used, e.g. in the specific examples, would be inconsistent with the broad meaning. The carrier may be a solid, semisold or liquid diluent or an ingestible capsule. Pharmaceutical preparations containing at least one of the novel compounds as the active ingredient constitute a further aspect of this invention. Usually the active substance will constitute between 0.1 and 95% by weight of the preparation, more especially between 0.5 and 20% by weight for preparations intended for injection and between 2 and 50% by weight for preparations suitable for oral administration.

To produce pharmaceutical preparations containing a compound of the invention in the form of dosage units for oral application, the selected compound may be mixed with a solid pulverulent carrier, e.g. lactose, saccharose, sorbitol, mannitol; starches such as potato starch, corn starch or amylopectin; cellulose derivatives, or gelatin, and a lubricant such as magnesium stearate, calcium stearate, a polyethylene glycol wax and the like, and then compressed to form tablets. If coated tablets are required, the cores, prepared as described above, may be coated with a concentrated sugar solution which may, for example, contain gum arabic, gelatin, talcum, titanium dioxide, or the like. Alternatively, the tablet can be coated with a lacquer dissolved in a readily volatile organic solvent or mixture of organic solvent. Dyestuffs may be added to these coatings in order to readily distinguish between tablets containing different active components or different amounts of the active compound.

By using several layers of the active drug, separated by slowly dissolving coats, sustained release tablets are obtained. Another way of preparing sustained release tablets is to divide the dose of the active drug into granules with coats of different thickness and compress the granules into tablets together with the carrier substance. The active substance can also be incorporated in slowly dissolving tablets made for instance of fat and wax substances or evenly distributed in a tablet of an insoluble substance such as a physiologically inert plastic substance.

Effervescent powders are prepared by mixing the active ingredient with non-toxic carbonates or hydrogen carbonates, such as calcium carbonate, potassium carbonate and potassium hydrogen carbonate, solid, non-toxic acids such as tartaric acid and citric acid.

For the preparation of soft gelatin capsules (pearl shaped closed capsules) consisting of gelatin and for example glycerol or similar closed capsules, the active substance may be admixed with a vegetable oil. Hard gelatin capsules may contain granulates of the active substance in combination with solid, pulverulent carriers such as lactose, saccharose, sorbitol, mannitol, a starch (e.g. potato starch, corn starch or amylopectin) a cellulose derivative or gelatin.

Liquid preparations for oral application may be in the form of syrups or suspensions, for example solutions containing from 0.2% to 20% by weight of the active substance, the balance being sugar and a mixture of ethanol, water, glycerol, and propylene-glycol. Optionally such liquid preparations may contain coloring agents, flavoring agents, saccharin and carboxymethylcellulose as a thickening agent.

Solutions for parenteral application by injection can comprise aqueous solutions of a water-soluble pharmaceutically acceptable salt of the active substance, preferably in a concentration of 0.5% to 10% by weight. These solutions may also contain stabilizing agents or buffering agents, or both and may conveniently be provided in various dosage unit ampoules.

The following examples illustrate the invention:

EXAMPLE 1

Preparation of 5-fluoronicotinic acid

A mixture of 5-aminonicotinic acid (108 g.) in 700 ml. of fluoboric acid (48–50% w./w.), 530 ml. of tetrahydrofuran and 350 ml. of water was cooled in an ice-salt bath and with stirring sodium nitrite (71 g.) in a saturated water solution was added at such a rate that the temperature was lower than 3° C. 350 ml. of tetrahydrofuran was added and the mixture stirred for one hour at −5° C. to −10° C. The precipitate formed was filtered off and thoroughly washed with cold ethanol, cold ether and petroleum ether until it was nearly colorless. This fluoborate salt was transferred to a large flask fitted with a stirrer and two reflux condensers and with about 500 ml. of dry ligroin (B.P. about 100° C.) and the flask was gently heated with an open flame at one point. An exothermic reaction started which soon spread to the whole mass of the salt. The decomposition was completed by refluxing for 30 minutes. The ligroin phase was decanted and the yellow product washed with ether. The product was dissolved in dilute aqueous sodium bicarbonate and reprecipitated with dilute aqueous hydrochloric acid. The precipitate was washed with water and dried to give 67 g. of weakly yellow product. This product may be purified by recrystallization, treatment with active carbon and a final sublimation to give a colorless product, M.P. 194° C. Identity was also established by IR-spectroscopy.

EXAMPLE 2

Preparation of tablets containing 5-fluoronicotinic acid 100 g. of 5-fluoronicotinic acid were mixed with 50 g. of lactose and 45 g. of potato starch and moistened with a starch paste prepared from 5 g. of potato starch and distilled water, whereafter the mixture was granulated through a sieve. The granulate was dried and sieved whereafter 2 g. of magnesium stearate were added. Finally the mixture was pressed into tablets, each weighing 202 mg.

EXAMPLE 3

5-fluoronicotinic acid ethylester 5-fluoronicotinic acid (43.6 g.) was refluxed for 4 hours with 550 ml. of thionyl chloride. Excess thionyl chloride was evaporated. To the acid chloride hydrochloride thus obtained 420 ml. of absolute ethanol were slowly added at room temperature. The mixture, which soon became homogenous, was refluxed for 2.5 hours. Excess ethanol was evaporated and the solid residue was treated with excess of saturated sodium hydrogen carbonate solution to liberate the basic form of the product. The mixture obtained was extracted three times with ether and the ether solution dried over sodium sulphate. Evaporation of solvent and distillation of the residue in vacuo gave 40.9 g. of nearly colorless liquid, B.P. 92–94° C. at 13 mm. Hg. $n_D^{25}=1.4820$. Analyses—Equivalent weight: Found 172; Calculated for $C_8H_8FNO_2$: 169.

EXAMPLE 4

5-fluoronicotinic acid n-hexyl ester 5-fluoronicotinic acid (4.0 g.) was dissolved by heating in a mixture of 6.0 ml. of sulfuric acid (95% w./w.) and 75 ml. of redistilled 1-hexanol and the solution was allowed to stand at 120° C. for 3.5 hours. The main part of the excess of 1-hexanol was driven off in vacuo at 80° C. and the residue was poured on about 200 ml. of ice water. The mixture was made slightly alkaline with concentrated ammonia solution and extracted with 4 portions of ether. The ether solution was dried over anhydrous sodium sulphate. The residue after evaporation was distilled at 13 mm. Hg and gave 2.9 g. of colorless liquid, B.P. 146–147° C., $n_D^{25}=1.4730$. Analyses—Found: C, 63.98; H, 7.22; F, 8.62; N, 6.18. Calculated for $C_{12}H_{16}FNO_2$: C, 63.98; H, 7.16; F, 8.43; N, 6.22.

EXAMPLE 5

5-fluoronicotinic acid methyl ester 5-fluoronicotinic acid (6.00 g.) was dissolved in a mixture of 10 ml. of concentrated sulfuric acid and 100 ml. of anhydrous methanol and the solution obtained was refluxed for 5 hours. Excess methanol was evaporated in vacuo and the residue poured on about 150 ml. of icewater. The mixture was made alkaline with solid sodium hydrogen carbonate and extracted with 4 portions of 50 ml. of ether. The ether solution was dried over anhydrous sodium sulphate, filtered and evaporated. The crystalline colorless residue weighed 5.75 g. and melted at 49.5–50.5° C. Recrystallization from petroleum ether gave 4.85 g. of colorless crystals melting at 50–50.5° C. Equivalent weight: Found 158.7; calculated for $C_7H_6FNO_2$:
155.1.

EXAMPLE 6

5-fluoronicotinic acid allylester

A solution of 5-fluoronicotinic acid chloride in pyridine-chloroform was prepared in the following way. 5-fluoronicotinic acid (33.0 g.) was refluxed with thionyl chloride (130 ml.) for 4 hours. The excess of thionyl chloride was evaporated under reduced pressure and then anhydrous chloroform (110 ml.) followed by anhydrous pyridine (45 ml.) was added. The mixture was heated at 90° C. for a few minutes and then cooled in an ice-bath. To this solution (42 ml. out of a total volume of 184 ml.) a solution of freshly distilled allyl alcohol (2.9 g.) in anhydrous chloroform (20 ml.) was added with stirring during 15 minutes. The reaction mixture was allowed to stand 20 hours at room temperature and was then added to a small amount of water. The chloroform layer was separated, washed twice with a saturated sodium bicarbonate solution and once with water, and then dried over anhydrous sodium sulfate. Evaporation of the chloroform gave 7.5 g. yellow oil, which was purified by distillation in vacuo to give 5.6 g. colorless liquid. B.P. 99–101° C./12 mm., $n_D^{25}=1.4953$. Analyses—Found: C, 59.47; H, 4.52; F, 10.71; N, 7.92%. Calculated for $C_9H_8FNO_2$: C, 59.67; H, 4.45; F, 10.49; N, 7.73%.

By the same procedure and using the same solution of 5-fluoronicotinic acid chloride, the following esters were prepared:

5-fluoronicotinic acid butylester, yield 60%, B.P. 113–114° C./12 mm., $n_D^{25}=1.4764$; Equivalent weight: Found: 200; calculated: 197.

5-fluoronicotinic acid iso-propylester, yield 60%, B.P. 90–91° C./12 mm., $n_D^{25}=1.4734$. Analyses—Found: C, 58.78; H, 5.33; F, 10.25; N, 7.81%. Calculated for $C_9H_{10}FNO_2$: C, 59.01; H, 5.50; F, 10.37; N, 7.65%.

5-fluoronicotinic acid 1-undecylester, yield 60%, B.P. 153–155° C./0.1 mm. Hg, $n_D^{25}=1.4711$. Analyses—Found: C, 69.20; H, 8.41; F, 6.30; N, 4.93%. Calculated for $C_{17}H_{26}FNO_2$: C, 69.15; H, 8.87; F, 6.43; N, 4.74%.

By the same procedure, but using a benzene solution of 5-fluoronicotinic acid chloride, 5-fluoronicotinic acid cyclohexylester was prepared: Yield 60%, B.P. 104–106° C./1.0–1.3 mm., $n_D^{25}=1.5017$. Analyses—Found: C, 64.70; H, 6.47; F, 8.57; N, 6.19%. Calculated for $C_{12}H_{14}FNO_2$: C, 64.56; H, 6.32; F, 8.51; N, 6.28%.

EXAMPLE 7

5-fluoro-3-pyridinemethyl-5-fluoronicotinate 5-fluoronicotinic acid (5.94 g.) was refluxed 4.5 hours with 24 ml. of thionyl chloride. Excess thionyl chloride was evaporated and the residue heated for 10 minutes at 80° C. with a mixture of chloroform (20 ml.) and pyridine (8 ml.). The solution was cooled in an ice-bath and a solution of 5-fluoro-3-pyridinemethanol (5.10 g.) in 15 ml. of chloroform was added with stirring during 30 minutes. The reaction mixture was stirred at room temperature for 2 hours and was then allowed to stand overnight. The mixture was poured out on ice-water and the chloroform phase separated and washed twice with a saturated aqueous solution of sodium hydrogen carbonate. The chloroform solution was dried over anhydrous sodium sulfate; filtered and the solvent evaporated to give 9.0 g. of nearly colorless product, M.P. 195.5–106.0 C. Analyses—Found C, 57.84; H, 3.35; F, 15.41; N, 11.11%. Calculated for $C_{12}H_8F_2N_2O_2$: C, 57.60; H, 3.22; F, 15.19; N, 11.20%.

The following compound was prepared in an analogous way:

3-pyridinemethyl 5-fluoroincotinate

Yield 75%, M.P. 56.6–57.0° C. (prisms) and 62.0–63.0° C. (needles). Analyses—Found C, 62.21; H, 4.02; F, 8.35; N, 12.03%. Calculated for $C_{12}H_9FN_2O_2$: C, 62.07; H, 3.91; F, 8.18; N, 12.07%.

EXAMPLE 8

5-fluoro-3-pyridinemethyl 5-fluoronicotinate

To a stirred suspension of 5-fluoronicotinic acid (7.05 g.) and 5-fluoro-3-pyridinemethanol (6.35 g.) in 70 ml. of anhydrous dioxane, a solution of N,N-dicyclohexylcarbodiimide (10.3 g.) in 50 ml. of anhydrous dioxane was added during one hour with ice-cooling. The reaction mixture was stirred at room-temperature during 16 hours and was then poured on a small amount of cold ethyl acetate. The urea precipitated was filtered off and the filtrate evaporated. The yellow semi-solid residue was dissolved in a small amount of chloroform, put on a short column of aluminum oxide and eluated with 200 ml. of chloroform. The residue after evaporation of the chloroform solution was recrystallized from petroleum ether with a little ethanol added. The product, 4.2 g., M.P. 105–106° C., was identical with the one prepared according to Example 7.

EXAMPLE 9

5-fluoro-3-pyridinemethyl nicotinate

Nicotinic acid (3.7 g.) was refluxed 1 hour with thionyl chloride (11.9 g.). Evaporation of excess thionyl chloride gave 4.95 g. of crude nicotinic acid chloride hydrochloride, which was covered with 10 ml. of anhydrous benezene. To this mixture a solution of 5-fluoro-3-pyridinemethanol in a mixture of 12 ml. of triethylamine and 40 ml. of benzene was added with stirring. The resulting mixture was refluxed for 5 hours. After cooling the triethylamine hydrochloride was filtered off and washed with benzene. The combined washings and the filtrate were evaporated in vacuo to give a semi-solid residue. The crude product was recrystallized from petroleum ether to give 3.5 g. of crystals with M.P. 65–67.5° C. Repeated recrystallizations from petroleum ether gave a completely colorless product with M.P. 68.5–69.5° C. Analyses—Calculated for $C_{12}H_9FN_2O_2$: C, 62.07; H, 3.91; F, 8.18; N, 12.07; O, 13.78%. Found: C, 62.03; H, 3.87; F, 8.05; N, 12.14%.

EXAMPLE 10

3-pyridineethyl 3-pyridineacetate

A mixture of 3-pyridineacetic acid (10.4 g.) 3-pyridinemethanol (9.3 g.) and concentrated sulfuric acid (10 ml.) in 200 ml. of benzene was refluxed during 6 hours. The reaction water formed was continually taken away by azeotropic distillation. The benzene phase was decanted and the oily residue dissolved in 50 ml. of cold water and the solution made alkaline with aqueous sodium carbonate. The alkaline mixture was extracted several times with diethyl ether, the extract dried over anhydrous potassium carbonate, filtered and the solvent evaporated to give 9.1 g. product. Distillation in vacuo gives 7.3 g. product, B.P. 162–162.5° C./0.3 mm. Hg; $n_D^{25}$=1.5540; hydrochloride M.P. 126–127° C. Analyses (hydrochloride)—Found: C, 52.8; H, 5.26; N, 8.76; O, 9.96; Cl, 22.65%. Calculated for $C_{14}H_{16}N_2O_2Cl_2$: C, 53.34; H, 5.12; N, 8.89; O, 10.15; Cl, 22.49%.

In an analogous way the following compounds were prepared:

5-fluoro-3-pyridinemethyl 3-pyridinebutyrate

Reflux period 70 hours with p-toluenesulfonic acid instead of sulfuric acid. Yield 60%, $n_D^{25}$=1.535. Analyses—Found: C, 65.55; H, 5.49; F, 6.80; N, 10.40%. Calculated for $C_{15}H_{15}FN_2O_2$: C, 65.68; H, 5.51; F, 6.93; N, 10.21%.

5-fluoro-3-pyridinemethyl 3-pyridineacetate

Reflux period 20 hours with p-toluenesulfonic acid instead of sulfuric acid. Yield 60%. M.P. 58.0–60.0° C. Analyses—Found: C, 63.33; H, 4.77; F, 7.55; N, 11.53%. Calculated for $C_{13}H_{11}FN_2O_2$: C, 63.41; H, 4.50; F, 7.72; N, 11.38%.

EXAMPLE 11

Pyridine-3-methyl 5-methylpyrazole-3-carboxylate 5-methylpyrazole-3-carboxylic acid (5.05 g.) and 3-pyridinemethanol (4.36 g.) was refluxed together with p-toluenesulfonic acid monohydrate (19 g.) in 100 ml. of benzene. A water-separator was used in order to withdraw the water in the reaction mixture. After 27 hours the benzene phase of the reaction mixture was decanted and the residue treated with excess aqueous sodium bicarbonate. The aqueous mixture was extracted with the decanted benzene phase and three portions of chloroform. The combined extracts were dried over anhydrous sodium sulfate, filtered and the solvent evaporated to give 4.9 g. of a yellow oil which spontaneously crystallized upon cooling. After recrystallization from benzene the product melted at 123.5–124.5° C. Analyses—Found: C, 60.5; H, 5.12; N, 19.4; O, 14.9%. Calculated for $C_{11}H_{11}N_3O_2$: C, 60.82; H, 5.11; N, 19.34; O, 14.73%.

In an analogous way using toluene as solvent, the following esters were also prepared:

5 - fluoropyridine - 3 - methyl 5 - methylpyrazole - 3 - carboxylate, yield 75%, M.P. 141.5–143° C. Analyses— Found: C, 55.96; H, 4.36; F, 7.96; N, 17.75%. Calculated for $C_{11}H_{10}FN_3O_2$: C, 56.17; H, 4.29; F, 8.08; N, 17.86%.

5-fluoropyridine-3-methyl pyrazole-3-carboxylate, yield 75%, M.P. 162° C.; equivalent weight found: 219; calculated 221.

EXAMPLE 12

5-fluoro-3-pyridinemethyl acetate

To 50 ml. of stirred acetic anhydride, 5-fluoro-3-pyridinemethanol (10.2 g.) was added slowly at room temperature. The reaction solution was allowed to stand for 3 days and then excess acetic anhydride was driven off in vacuo. The residue was distilled in vacuo to give 9.3 g. of colorless product, B.P. 102–105° C./10 mm., Hg, $n_D^{25}$=1.4850. Analyses—Found: C, 57.02; H, 4.87; F, 11.07; N, 8.45%. Calculated for $C_8H_8FNO_2$: C, 56.80; H, 4.76; F, 11.23; N, 8.28%.

EXAMPLE 13

5-fluoro-3-pyridinemethyl caprylate

To a stirred solution of 5-fluoro-3-pyridinemethanol (3.8 g.) and 13 ml. of triethylamine in 100 ml. of anhydrous benzene, a solution of caprylic acid chloride (4.9 g.) in 25 ml. of benzene was slowly added at room temperature. The mixture was stirred for 30 minutes at room temperature and then refluxed during 2 hours. After cooling the precipitate of amine hydrochloride was filtered off and washed with benzene. The combined washings and filtrate were evaporated in vacuo to give 8.3 g. of liquid residue. This was distilled in vacuo to give 5.1 g. of nearly colorless liquid, B.P. 145–150° C./0.05 mm. Hg; $n_D^{25}$=1.4730. Analyses—Found: C, 66.25; H, 7.86; F, 7.33; N, 5.60%. Calculated for $C_{14}H_{20}FNO_2$: C, 66.38; H, 7.96; F, 7.50; N, 5.53%.

EXAMPLE 14

5-fluoro-3-pyridinemethyl pivalate

To a well stirred and ice-cooled solution of 5-fluoro-3-pyridinemethanol (6.35 g.) and 15 ml. of triethylamine in 100 ml. of dry benzene, a solution of pivaloyl chloride (6.0 g.) in 10 ml. of dry benzene was added during one hour. The reaction mixture was stirred 4.5 hours at room temperature and then filtered. The filtrate was washed twice with 50 ml. of a saturated aqueous solution of sodium hydrogen carbonate and then dried over anhydrous sodium sulfate. Filtering and evaporation of the solvent gave 8.7 g. of yellow-red oil, which was distilled in vacuo to give 5.45 of colorless product, B.P. 119–121.5° C./13 mm. Hg; $n_D^{25}=1.470$. Analyses—Found: C, 62.50; H, 6.53; F, 8.91; N, 6.80%. Calculated for $C_{11}H_{14}FNO_2$: C, 62.54; H, 6.68; F, 8.99; N, 6.63%.

5-fluoro-3-pyridinemethyl vinylacetate was prepared in an analogous way. Yield 55%; B.P. 89–91° C./0.8 mm. Hg; $n_D^{25}=1.497$. Analyses—Found: C, 61.05; H, 5.55; F, 9.63; N, 7.15%. Calculated for $C_{10}H_{10}FNO_2$: C, 61.53; H, 5.16; F, 9.73; N, 7.18%.

EXAMPLE 15

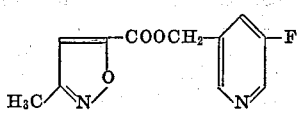

5-fluoro-3-pyridinemethyl 3-methyl-5-isoxazolecarboxylate 3-methyl-5-isoxazolecarboxylic acid (6.35 g.), 5-fluoro-3-pyridinemethanol (6.35 g.) and p-toluenesulfonic acid monohydrate (14.3 g.) was refluxed 47 hours in 100 ml. of toluene. The water in the reaction mixture was continuously removed by azeotropic distillation. The residue after evaporation of the solvent was treated with an excess of saturated aqueous solution of sodium hydrogen carbonate. The precipitate was filtered off and recrystallized from diisopropyl ether to give 4.75 g. weakly yellow product, M.P. 79–81° C., which could be raised to 80.0–81.5° C. by repeated recrystallizations from diisopropyl-ether. Analyses—Found: C, 54.35; H, 3.80; F, 8.31; N, 11.90%. Calculated for $C_{11}H_9FN_2O_3$: C, 55.93; H, 3.84; F, 8.04; N, 11.86%.

In the same way 5-fluoro-3-pyridinemethlyl 5-methyl-3-isoxazolecarboxylic acid was prepared; M.P. 69.0–71.5° C. Analyses—Found: C, 56.03; H, 3.97; F, 7.79; N, 11.54%. Calculated for $C_{11}H_9FN_2O_3$: C, 55.93; H, 3.84; F, 8.04; N, 11.86%.

EXAMPLE 16

Diester of 5-fluoronicotinic acid and ethylene glycol 5-fluoronicotinic acid was refluxed for 3.5 hours with 60 ml. of thionyl chloride. Excess thionylchloride was distilled off in vacuo and the residue heated with a mixture of pyridine (25 ml.) and benzene (50 ml.) at 60–70° C. during one hour. The solution was cooled in an ice-bath and ethylene glycol (1.50 g.) was added with stirring. The mixture was allowed to stand for 24 hours at room temperature and was then poured out on 200 ml. of ice-water. The aquous mixture was made alkaline with sodium hydrogen carbonate and extracted with four portions of diethyl ether. The extract was dried over anhydrous sodium sulphate, filtered and the solvent evaporated to give a crystalline residue, which was triturated with a little cold petroleum ether. Yield 6.21 g., M.P. 84–90° C. Recrystallization from diisopropyl ether gave 5.35 g. of colorless product with M.P. 91.0–91.5° C. Analyses.—Found: C, 54.88; H, 33.39; F, 12.53; N, 9.05%. Calculated for $C_{14}H_{10}F_2N_2O_4$: C, 54.55; H, 3.27; F, 12.33; N, 9.09%.

In an analogous way the following compounds were prepared:

Diester of 5-fluoronicotinic acid and hexane-1,2-diol

Yield 80%; M.P. 56.0–56.5° C. Analyses.—Found: C, 59.75; H, 5.16; F, 11.07; N, 8.17%. Calculated for $C_{18}H_{18}F_2N_2O_4$: C, 59.34; H, 4.98; F, 10.43; N, 7.69%.

Diester of 5-fluoronicotinic acid and propane-1,2-diol

Yield 50%; M.P. 192–194° C./0.3 mm. Hg; $n_D^{25}=1.5200$. Analyses—Found: C, 55.66; H, 4.17; F, 11.90; N, 8.54%. Calculated for $C_{15}H_{12}F_2N_2O_4$: C, 55.91; H, 3.75; F, 11.79; N, 8.69%.

Diester of 5-fluoronicotinic acid and trans-2-butene-1,4-diol

Yield 75%; M.P. 115.5–116.0° C. Analyses—Found: C, 57.67; H, 3.70; F, 11.24; N, 8.24%. Calculated for $C_{16}H_{12}F_2N_2O_4$: C, 57.49%.

EXAMPLE 17

Diester of succinic acid and 5-fluoro-3-pyridine methanol

Succinic acid (2.36 g.), 5-fluoro-3-pyridine methanol (5.1 g.) and p-toluene sulfonic acid monohydrate (10.0 g.) were refluxed 23 hours in 50 ml. of benzene. The water in the reaction mixture was continuously removed by azeotropic distillation. The mixture was poured out on ice-water and made alkaline with sodium hydrogen carbonate. The precipitate formed was filtered off, washed with water and dried. It weighed 2.9 g., M.P. 80.0–81.0° C., after recrystallization from ether-ethanol, M.P. 80.0–81.5° C. Analyses—Found: C, 57.30; H, 4.22; F, 11.33; N, 8.57%. Calculated for $C_{16}H_{14}F_2N_2O_4$: C, 57.14; H, 4.20; F, 11.30; N, 8.33%.

In an analogous way the following compounds were also prepared:

Diester of adipic acid and 5-fluoro-3-pyridine methanol

Yield 65%; M.P. 57.0–57.5° C. Analyses—Found: C, 59.59; H, 4.96; F, 10.59; N, 7.70%. Calculated for $C_{18}H_{18}F_2N_2O_4$: C, 59.34; H, 4.98; F, 10.43; N, 7.69%.

Diester of suberic acid and 5-fluoro-3-pyridine methanol

Yield 45%; M.P. 63.0–64.0° C. Analyses—Found: C, 61.40; H, 5.60; F, 9.53; N, 7.09%. Calculated for $C_{20}H_{22}F_2N_2O_4$: C, 61.22; H, 5.65; F, 9.68; N, 7.14%.

Diester of fumaric acid and 5-fluoro-3-pyridine methanol

Yield 30%; M.P. 120.5–122° C. Equivalent weight (titration as base) — Found: 167. Calculated for $C_{16}H_{12}F_2N_2O_4$: 167.2. The identity and purity of the product was also established NMR spectroscopy.

EXAMPLE 18

5-fluoro-3-pyridine methanol

To a stirred solution of ethyl 5-fluoronicotinate (54.1 g.) in 270 ml. of methanol, potassium borohydride (53.9 g.) was added with cooling over a period of one hour. The mixture was stirred 30 minutes at room temperature and then refluxed for 6 hours. The solution was stirred overnight at room temperature and then most of the solvent was evaporated. The residue was dissolved in 300 ml. of water and after one hour extracted with five 100 ml. portions of ether. The ether solution was dried over anhydrous sodium sulfate, filtered and the solvent evaporated to give 38 g. of a yellow oil. The oil was distilled in vacuo to give 29.6 g. colorless product, B.P. 83–85° C./0.05–0.01 mm. Hg. The hydrochloride melts (after repeated recrystallizations from ethanol) at 126° C. Analyses—Found: C, 44.19; H, 4.59; N, 8.70; F, 11.42; Cl, 21.52%. Calculated for $C_6H_7NOFCl$: C, 44.05; H, 4.32; N, 8.56; F, 11.61; Cl, 21.68%.

EXAMPLE 19

5-fluoro-3-pyridinemethanol

To a stirred ice-cooled solution of lithium aluminum hydride (14.4 g.) in 530 ml. of anhydrous ether a precooled solution of ethyl 5-fluoronicotinate (64.3 g.) in 370 ml. of anhydrous ether was added during 1.5 hours at a reaction temperature not exceeding 6° C. The mixture was stirred with cooling for 30 minutes and then 72 ml. of a sodium sulfate solution in water (5 ml./g.) was slowly added with stirring and cooling. The mixture was filtered and the solid material washed with ether. The combined ether solutions were dried, filtered and the solvent evaporated to give 36.6 g. red oil. This was converted to the hydrochloride, which after repeated recrystallizations from ethanol melts at 162° C. The product was shown to be identical with the one prepared according to Example 18.

EXAMPLE 20

5-fluoro-3-pyridinemethanol

The starting material 5-fluoro-3-cyanopyridine, M.P. 53–54.5° C., was prepared by dehydration of the known 5-fluoronicotinamide with phosphorus pentaoxide.

5-fluoro-3-cyanopyridine (1.50 g.) was dissolved in a mixture of 2.5 ml. of concentrated hydrochloric acid and 25 ml. of water and hydrogenated at atmospheric pressure and room temperature over 10% Pd/C (0.40 g.). After 8 hours 535 ml. of hydrogen had been consumed. The hydrogenation was interrupted for 3 days and then further hydrogenated during one hour over an additional amount of 10% Pd/C (0.30 g.). A total amount of 600 ml. of hydrogen was consumed. The catalyst was filtered off and washed with water. The combined filtrate and washings were concentrated to a volume of 25 ml. made alkaline by addition of solid sodium hydrogen carbonate and extracted five times with 40 ml. of butyl acetate. The extract was dried over anhydrous sodium sulfate, filtered and the solvent evaporated to give an oily residue, which was transformed to a hydrochloride salt. This product, which was colorless, weighed 1.42 g. and had an IR spectrum which was identical with the one obtained from the product according to Example 18.

EXAMPLE 21

5-fluoro-3-pyridinemethanol 5-fluoronicotinic acid (3.00 g.) was refluxed 4 hours with 30 ml. of thionyl chloride and the excess of thionyl chloride evaporated in vacuo. The 5-fluoronicotinc acid chloride thus obtained was dissolved in 30 ml. of diglyme and treated while stirring with sodium borohydride (2.40 g.), first 15 minutes at 35° C. and then 30 minutes at 80° C. The mixture was poured out on ice and carefully acidified with diluted aqueous hydrochloric acid. The aqueous solution was washed with two portions of ether and its volume reduced in vacuo to about 50 ml. It was then made alkaline with aqueous ammonia and extracted with five portions of chloroform. The chloroform solution was dried over anhydrous sodium sulfate filtered and the solvent evaporated to give an oily product, which was transformed a hydrochloride salt. The dry salt weighed 1.35 g. and had an IR spectrum which was identical with the one obtained from the product prepared according to Example 18.

EXAMPLE 22

5-fluoro-3-pyridinemethanol

The starting material S-benzyl 5-fluoro-3-pyridinecarbothioate M.P. 42–44° C., was prepared by the reaction of 5-fluoronicotinoyl chloride with benzylmercaptan.

S-benzyl 5-fluoro-3-pyridinecarbothioate (1.00 g.) was stirred 3 hours at room temperature with freshly prepared Raney nickel (W4, 10 g.) in 70 ml. of ethanol. The metal was filtered off and thoroughly washed with ethanol.

To the combined filtrate and washings were added a small excess of hydrogen chloride in ether. Evaporation of the solvent in vacuo gave the hydrochloride salt, which was washed with ether and air-dried. The colorless product weighed 0.43 g. and had an IR spectrum which was identical with the one obtained from the product according to Example 18.

EXAMPLE 23

PHARMACOLOGICAL TESTS

Compounds according to the invention were tested with regard to lowering the concentration of free fatty acids in the serum of dogs according to the method described in Carlsson, L. A. and Liljedahl, S. O., "Lipid metabolism and trauma. 11. Studies on the effect of nicotinic acid on norepinephrine induced fatty liver." Acta Med. Scand. 173 (1963), 787–791, and Bergstrom, S., Carlsson, L. A. and Oro, L. "Effect of prostaglandins on catecholamine induced changes in the free fatty acids of plasma and in blood pressure in the dog. Prostaglandin and related factors 22," Acta Physiol. Scand. 60 (1964), 170–180. According to this method, the compound is tested on a model for the stress situation in which noradrenaline stimulated lipid mobilization is known to occur.

Anaesthetized dogs were given continuous intravenous infusions of noradrenaline at a constant rate (0.5 μg./kg. bodyweight per minute). The test substance was injected intravenously 60 min. after the start of infusion. The arterial level of free fatty acids as a function of time was followed. Nicotinic acid was used as reference. The qualitative effect is given in Table I.

The qualitative effect was judged from the total depression of free fatty acid serum concentration and the duration of the depression. The effect of each compound was judged from the relative depression "$a$," as calculated in percent of the total rise in free fatty acid serum concentration induced by the noradrenaline infusion, and from the total duration, "$b$" (minutes) of more than a 50% depression of free fatty acid serum concentration. The test results at a dosage level of 25 mg./kg. are classified according to the following scheme:

| $a$, percent | $b$, minutes | Effect |
|---|---|---|
| >80 | >100 | ++++ |
| >80 | <100 | +++ |
| 20–79 | >100 | ++ |
| 20–79 | <100 | + |
| <20 | -- | 0 |

TABLE I

| Compound | Qualitative effect |
|---|---|
| Nicotinic acid (reference) | +++ |
| 5-fluoronicotinic acid | ++++ |
| 5-fluoronicotinic acid methyl ester | ++ |
| 5-fluoronicotinic acid ethyl ester | ++++ |
| 5-fluoronicotinic acid n-butyl ester | +++ |
| 5-fluoronicotinic acid n-hexyl ester | +++ |
| 5-fluoronicotinic acid n-undecyl ester | +++ |
| 5-fluoronicotinic acid i-propyl ester | ++++ |
| 5-fluoronicotinic acid allyl ester | ++ |
| 5-fluoronicotinic acid cyclohexyl ester | +++ |

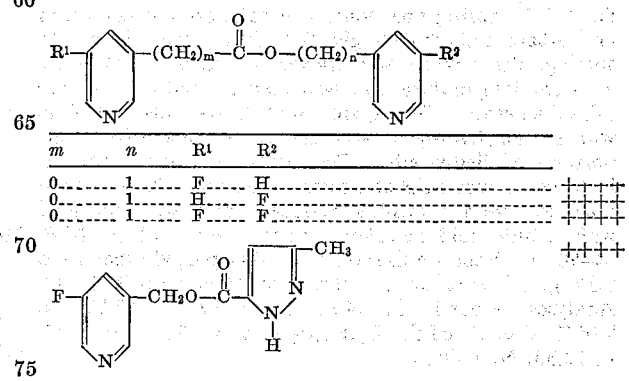

| $m$ | $n$ | $R^1$ | $R^2$ | |
|---|---|---|---|---|
| 0 | 1 | F | H | ++++ |
| 0 | 1 | H | F | ++++ |
| 0 | 1 | F | F | ++++ |

TABLE I—Continued

| Compound | | | Qualitative effect |
|---|---|---|---|

R¹—⟨pyridine⟩—CH₂—O—C(=O)—R²

| R¹ | R² | | |
|---|---|---|---|
| F | CH₃ | | ++++ |
| F | (CH₃)₃C | | ++++ |
| F | CH₂=CH—CH₂ | | ++++ |
| F | (CH₂)₆CH₃ | | +++ |

F—⟨pyridine⟩—CH₂—O—C(=O)—O—⟨pyridine⟩—CH₃   ++++

R¹—⟨pyridine⟩—C(=O)—O—R²—O—C(=O)—⟨pyridine⟩—R³

| R¹ | R³ | R² | |
|---|---|---|---|
| F | F | —CH₂—CH₂— | +++ |
| H | H | —CH₂—CH₂— | +++ |
| F | F | —(CH₂)₆— | +++ |
| F | F | —CH—CH₂— <br> \|<br> CH₃ | +++ |
| F | F | H₂C\C=C/H <br>     H/  \CH₂— | +++ |

R¹—⟨pyridine⟩—CH₂—O—C(=O)—R²—C(=O)—O—CH₂—⟨pyridine⟩—R³

| R¹ | R³ | R² | |
|---|---|---|---|
| F | F | —CH₂—CH₂— | ++++ |
| F | F | —(CH₂)₄— | ++++ |
| F | F | —(CH₂)₆— | ++++ |
| F | F | —CH=CH—(trans.) | ++++ |

F—⟨pyridine⟩—CH₂OH   ++++

---

5-fluoronicotinic acid has a low toxicity. The toxicity of 5-fluoronicotinic acid upon i.p. administration in mice given as the $LD_{50}$-value was found to be 2.0 g./kg. bodyweight. The corresponding toxicity of nicotinic acid was found to be 0.5 g./kg. bodyweight.

The resorption of 5-fluoronicotinic acid in serum of dogs was studied. 200 mg. of the test compound were orally administered to the dog in the form of a tablet also containing 200 mg. of physiologically inert material. The amount of the test compound in the blood serum was analyzed at different times according to Hughes, D. E. and Williamson, D. H., Biochem. J. 55 (1953), 851. A comparison with nicotinic acid was made in each case. The maximum resorption and the duration (given as the time after administration when the serum concentration had decreased to 25% of the maximum concentration) is given in Table II.

TABLE II

| Compound | Maximum resorption (γ/ml. serum) | Duration (hours) |
|---|---|---|
| 5-fluoronicotinic acid | 59.3 | 7.2 |
| Nicotinic acid | 53.2 | 1.9 |

The resorption of pyridine methanols in serum of dogs was also studied. 100–200 mg. of the substance to be tested was orally administered to the dog in the form of a tablet or a capsule. The amount of the test compound was analyzed as the corresponding nicotinic acid derivative (the metabolism to these acids is very rapid) at different times according to Hughes, D. E. and Williamson, D. H., Biochem. J. 55 (1953), 851. A comparison with the unsubstituted analogue was made. The maximum resorption and the duration (given as the time after administration when the serum concentration had decreased to 25% of the maximum concentration) of the compound of Formula XIII, wherein R¹ has specified significance is given in Table III.

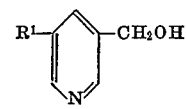

R¹—⟨pyridine⟩—CH₂OH  (XIII)

TABLE III

| R¹ | Administered amount, g. | Way of administration | Maximum resorption, γ/ml. serum | Duration, hours |
|---|---|---|---|---|
| F | 0.2 | Tablet | 47.6 | 3.5 |
| H | 0.2 | do | 32.2 | 1.7 |
| H | 0.2 | Capsule | 32.2 | 1.7 |

The compound 5-fluoro-3-pyridinemethanol has a low toxicity as may be seen from Table IV below, wherein the toxicity in mice upon intraperitoneal administration of a compound of the Formula XIII is given.

TABLE IV

R¹ ---------------------------------------------- F
Toxicity (i.p.) $LD_{50}$ g./kg. mice ------------------ 2

The compound 5-fluoro-3-pyridinemethanol was also tested with respect to its vasodilating properties. Changes in the peripheral blood flow of one hind leg of cat was recorded as follows:

The blood of the femoral artery was bypassed in a loop of polyethylene tubing inserted into the artery. The blood flow through the loop was adjusted by a digital pump. Just distal of the pump arterial pressure was measured. The pressure recorded is then dependent on the pump flow and the resistance distally of the pump. If the flow is kept constant the pressure changes will thus reflect changes in the peripheral resistance.

Intraarterial injections of 5-fluoro-3-pyridinemethanol (0.1% solution in isotonic sodium chloride solution, 1 mg. substance/min.) gave 23% decrease in the vascular resistance.

EXAMPLE 24

Preparation of soft gelatin capsules containing 5-fluoronicotinic acid ethylester 500 g. of 5-fluoronicotinic acid ethylester were mixed with 500 g. of corn oil whereafter the mixture was filled in soft gelatin capsules, each capsule containing 100 mg. of mixture (i.e. 50 mg. of active substance).

EXAMPLE 25

Preparation of soft gelatin capsules containing 5-fluoronicotinic acid methylester 500 g. of 5-fluoronicotinic acid methylester were mixed with 750 g. of peanut oil whereafter the mixture was filled in soft gelatin capsules, each capsule containing 125 mg. of mixture (i.e. 50 mg. of active substance).

EXAMPLE 26

Preparation of tablets containing 5-fluoronicotinic acid ethylester 50 kg. of 5-fluoronicotinic acid ethylester were mixed with 20 kg. of silicon dioxide of the trademark Aerosil, whereafter 45 kg. of potato starch and 50 kg. of lactose were mixed in and the mixture moistened with a starch paste prepared from 5 kg. of potato starch and distilled water, whereafter the mixture was granulated through a sieve. The granulate was dried and sieved whereafter 2 kg. of magnesium stearate were mixed in. Finally the mixture was pressed into tablets, each weighing 172 mg.

EXAMPLE 27

Preparation of an emulsion containing 5-fluoronicotinic acid ethylester 100 g. of 5-fluoronicotinic acid ethylester were dissolved in 2500 g. of peanut oil. From the solution thus obtained, 90 g. of gum arabic, aroma and color (q.s.) and 2500 g. of water an emulsion was prepared.

EXAMPLE 28

Preparation of a syrup containing 5-fluoronicotinic acid isopropylester 100 g. of 5-fluoronicotinic acid allylester were dissolved in 300 g. of 95% ethanol where 300 g. of glycerol, aroma and color (q.s.) and water 1.000 ml. were mixed in. A syrup was thus obtained.

EXAMPLE 29

Preparation of a solution containing 5-fluoronicotinic acid ethylester 100 g. of 5-fluoronicotinic acid ethylether were dissolved in 2.000 g. of polyoxyethylene sorbitan monooleate, whereafter aroma and color (q.s.) and water to 5.000 ml. were mixed in. A clear drop solution was thus obtained.

EXAMPLE 30

Preparation of a syrup containing vitamins and 5-fluoronicotinic acid

The syrup was prepared from the following ingredients:

| | | |
|---|---|---|
| 5-fluoronicotinic acid | g | 7.0 |
| Polyoxyethylenesorbitol monooleate | g | 0.4 |
| Vitamin A | IE | 12.000 |
| Vitamin C | g | 2 |
| Vitamin $B_1$ | mg | 50 |
| Vitamin $B_2$ | mg | 70 |
| Vitamin $B_6$ | mg | 10 |
| Pantothenol | mg | 100 |
| Caffeine | mg | 300 |
| Sorbitol | mg | 20 |

Aroma, color (q.s.).
Water to 100 ml.

Vitamin A was dissolved in the polyoxyethylene sorbitan monooleate while heating to about 60° C., whereafter 20 ml. of water was mixed in. The caffeine was dissolved in 10 ml. of water, while heating to about 90° C. The remaining ingredients were mixed in about 60 ml. of water, whereafter the vitamin A and caffeine solutions were added while stirring. The pH was adjusted to 4.5–5.5 by addition of sodium hydroxide solution and the syrup made up to 100 ml. with water. The whole procedure was carried out in nitrogen atmosphere. A normal dose is contained in 15 ml. of the syrup.

EXAMPLE 31

Preparation of a drop solution containing 5-fluoronicotinic acid 100 g. of 5-fluoronicotinic acid were mixed with 300 g. of ethanol, whereafter 300 g. of glycerol, water to 1.000 ml. aroma and color (q.s.) and 0.1 N sodium hydroxide solution (to pH 4.5–5.5) were added while stirring. A drop solution was thus obtained.

EXAMPLE 32

Preparation of a sustained release tablet containing 5-fluoronicotinic acid 200 g. of 5-fluoronicotinic acid were melted together with 50 g. of stearic acid and 50 g. of carnauba wax. The mixture thus obtained was cooled and ground to a particle size of at most 1 mm. (diameter). The mass thus obtained was mixed with 5 g. of magnesium stearate and pressed into tablets each weighing 305 mg. Each tablet thus contains 200 mg. of active substance.

Thus, novel fluoro-pyridine derivatives and pharmaceutical preparations containing them are now provided which have valuable vasodilating properties and which are effective in lowering excessive lipid and free fatty acid concentration in serum.

While the foregoing specification is an accurate and complete disclosure, it is not intended to limit the scope of the invention as defined by the following claims.

We claim:

1. A method of lowering excessive serum lipid concentration which comprises administering to animals, including man, a therapeutically effective dose containing at least one compound selected from the group consisting of fluoro-pyridine derivatives having the formula

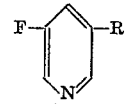

and therapeutically acceptable salts thereof, wherein R is COOH, $CH_2OH$, $COOCH_3$, $COOC_2H_5$, $COOC_4H_9$, $COOC_6H_{13}$, $COOC_{11}H_{23}$, $COOCH(CH_3)_2$, $COOCH_2$—$CH$=$CH_2$,

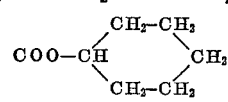

—$CH_2OCOCH_3$, $CH_2OCOC(CH_3)_3$, $CH_2OCOCH_2$—$CH$=$CH_2$, or $CH_2OCO(CH_2)_6CH_3$.

2. The method of claim 1 wherein the compound is 5-fluoronocotoinic acid or a therapeutically acceptable salt thereof.

3. The method of claim 1 wherein the compound is 5-fluoro-3-pyridine methanol or a therapeutically acceptable salt thereof.

4. A method of lowering the concentration of free fatty acids in serum which comprises administering to animals, including man, a therapeutically effective dose containing at least one compound selected from the group consisting of fluoro-pyridine derivatives having the formula

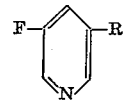

and therapeutically acceptable salts thereof, wherein R is COOH, $CH_2OH$, $COOCH_3$, $COOC_2H_5$, $COOC_4H_9$, $COOC_6H_{13}$, $COOC_{11}H_{23}$, $COOCH(CH_3)_2$, $COOCH_2$—$CH$=$CH_2$,

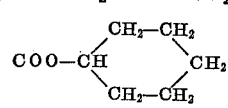

—$CH_2OCOCH_3$, $CH_2OCOC(CH_3)_3$, $CH_2OCOCH_2$—$CH_2$=$CH_2$, or $CH_2OCO(CH_2)_6CH_3$.

5. The method of claim 4 wherein the compound is 5-fluoronicotinic acid or a therapeutically acceptable salt thereof.

6. The method of claim 4 wherein the compound is 5-fluoro-3-pyridine methanol or a therapeutically acceptable salt thereof.

7. A method of lowering excessive serum lipid concentration which comprises administering to animals, including man, a therapeutically effective dose of at least one compound selected from the group of fluoro-pyridine derivatives having the formula

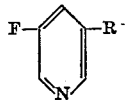

and therapeutically acceptable salts thereof, wherein R is

—COO—CH₂—⟨pyridyl⟩,

—COO—CH₂—⟨pyridyl⟩—F,

—COOCH₂CH₂OCO—⟨pyridyl⟩—F,

—COO(CH₂)₆OCO—⟨pyridyl⟩—F,

—COOCH—CH₂—OCO—⟨pyridyl⟩—F,
      |
      CH₃

—COOCH₂CH=CH—CH₂—OCO—⟨pyridyl⟩—F,

—COOCH₂CH₂OCO—⟨pyridyl⟩,

—CH₂OCOCH₂CH₂COOCH₂—⟨pyridyl⟩—F,

—CH₂OCO(CH₂)₄COOCH₂—⟨pyridyl⟩—F,

—CH₂OCO(CH₂)₇—COOCH₂—⟨pyridyl⟩—F,

—CH₂OCOCH=CHCOOCH₂—⟨pyridyl⟩—F, or

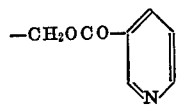

8. A method of lowering the concentration of free fatty acids in serum which comprises administering to animals, including man, a therapeutically effective dose of at least one compound selected from the group of fluoro-pyridine derivatives having the formula F—⟨pyridyl⟩—R and therapeutically acceptable salts thereof, wherein R is —COO—CH₂—⟨pyridyl⟩;

—COO—CH₂—⟨pyridyl⟩—F,

—COOCH₂CH₂OCO—⟨pyridyl⟩—F,

—COO(CH₂)₆OCO—⟨pyridyl⟩—F,

—COOCH—CH₂—OCO—⟨pyridyl⟩—F,
      |
      CH₃

—COOCH₂CH=CH—CH₂—OCO—⟨pyridyl⟩—F,

—COOCH₂CH₂OCO—⟨pyridyl⟩;

—CH₂OCOCH₂CH₂COOCH₂—⟨pyridyl⟩—F,

—CH₂OCO(CH₂)₄COOCH₂—⟨pyridyl⟩—F,

—CH₂OCO(CH₂)₆—COOCH₂—⟨pyridyl⟩—F,

—CH₂OCOCH=CHCOOCH₂—⟨pyridyl⟩—F, or

—CH₂OCO—⟨pyridyl⟩

9. A method of lowering excessive serum lipid concentration which comprises administering to animals, including man, a therapeutically effective dose containing at least one compound selected from the group consisting of fluoro-pyridine derivatives having the formula

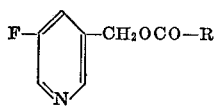

and therapeutically acceptable salts thereof, wherein R is

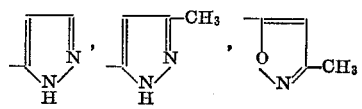

or

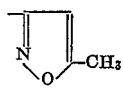

10. A method for lowering the concentration of free fatty acids in serum which comprises administering to animals, including man, a therapeutically effective dose containing at least one compound selected from the group consisting of fluoro-pyridine derivatives having the formula

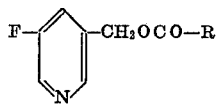

and therapeutically acceptable salts thereof, wherein R is

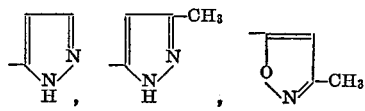

or

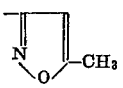

11. A pharmaceutical preparation for lowering excessive serum lipid concentration which comprises a therapeutically effective lipid lowering amount of at least one compound of the formula

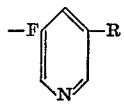

or therapeutically acceptable salts thereof, wherein R is COOH, CH₂OH, COOCH₃, COOC₂H₅, COOC₄H₉, COOC₆H₁₃, COOC₁₁H₂₃, COOCH(CH₃)₂,

COOCH₂—CH=CH₂,

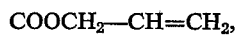
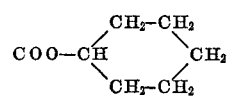

—CH₂OCOCH₃, CH₂OCOC(CH₃)₃,

CH₂OCOCH₂—CH=CH₂, or CH₂OCO(CH₂)₆CH₃, in association with a pharmaceutically acceptable carrier.
12. The pharmaceutical preparation of claim 11 wherein the compound is 5-fluoronicotinic acid or a therapeutically acceptable salt thereof.
13. The pharmaceutical preparation of claim 11 wherein the compound is 5-fluoro-3-pyridine methanol or a therapeutically acceptable salt thereof.

14. A pharmaceutical preparation for lowering excessive serum lipid concentration which comprises a therapeutically effective lipid lowering amount of at least one compound of the formula

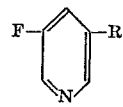

or therapeutically acceptable salts thereof, wherein R is

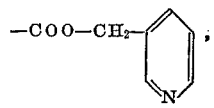

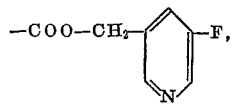

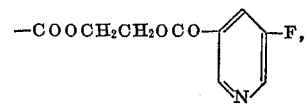

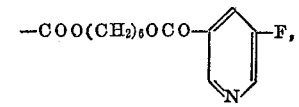

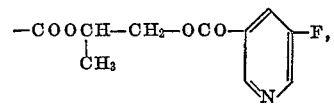

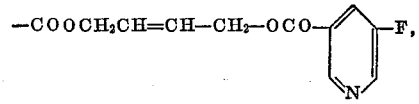

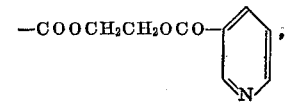

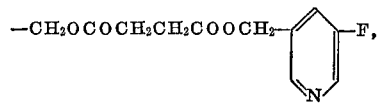

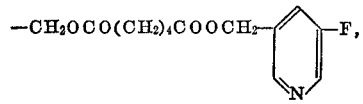

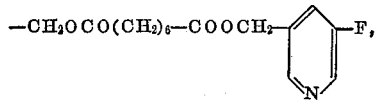

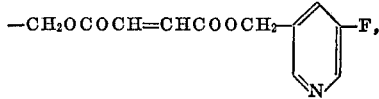

or

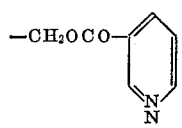

in association with a pharmaceutically acceptable carrier.
15. A pharmaceutical preparation for lowering excessive serum lipid concentration which comprises a therapeutically effective lipid lowering amount of at least one compound of the formula
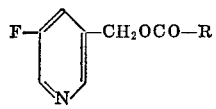
or therapeutically acceptable salts thereof, wherein R is
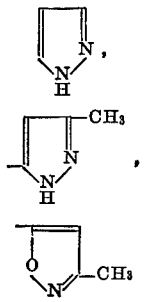
and
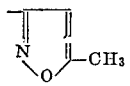
in association with a pharmaceutically acceptable carrier.
References Cited
UNITED STATES PATENTS
3,557,131   1/1971   Yoshimura _____ 260—295.5
ALBERT T. MEYERS, Primary Examiner
A. P. FAGELSON, Assistant Examiner
U.S. Cl. X.R.
260—294.8 R, 295.5 R, 297 R; 424—266

UNITED STATES PATENT OFFICE
CERTIFICATE OF CORRECTION

Patent No. 3,737,542            Dated June 5, 1973

Inventor(s) Lars Anders Fritz Carlsson et al.

It is certified that error appears in the above-identified patent and that said Letters Patent are hereby corrected as shown below:

Col. 5, line 8, "$(CH_2)_6CO_3$" should be -- $(CH_2)_6CH_3$ --;

Col. 5, lines 10-14, "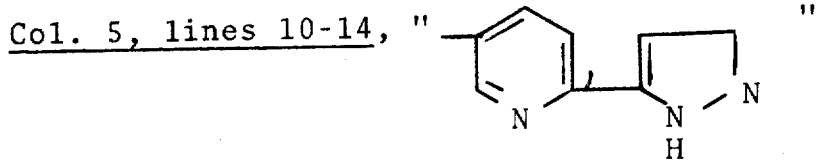"

should be -- 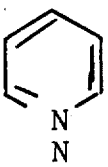 --;

Col. 20, cl. 2, line 2, "fluoronocotoinic" should be -- fluoronicotinic --;

Col. 21, cl. 7, formula 3 from bottom, "$-CH_2OCO(CH_2)_1-COOCH_2-$" should be -- $-CH_2OCO(CH_2)_6-COOCH_2-$ --;

Col. 24, cl. 14, last formula, "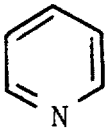"

should be -- 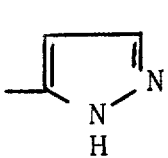 --;

Signed and sealed this 26th day of February 1974.

(SEAL)
Attest:

EDWARD M. FLETCHER, JR.
Attesting Officer

C. MARSHALL DANN
Commissioner of Patents